(12) United States Patent
Batdorff et al.

(10) Patent No.: US 7,731,443 B2
(45) Date of Patent: Jun. 8, 2010

(54) MOUNTING SYSTEM FOR MODULAR FRAME COMPONENTS

(75) Inventors: Jonathan D. Batdorff, Fort Wayne, IN (US); Mark E. Barnes, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 282 days.

(21) Appl. No.: 11/695,651

(22) Filed: Apr. 3, 2007

(65) Prior Publication Data

US 2008/0245599 A1 Oct. 9, 2008

(51) Int. Cl.
*F16D 9/08* (2006.01)

(52) U.S. Cl. .................. 403/12; 403/279; 403/373; 411/113

(58) Field of Classification Search .............. 403/2, 403/12, 278, 279, 281, 282; 411/111–113, 411/546; 29/897.2, 525.01, 525.02, 525.05; 180/311

See application file for complete search history.

(56) References Cited

U.S. PATENT DOCUMENTS

| | | | | |
|---|---|---|---|---|
| 3,700,020 A | * | 10/1972 | Wallace | 411/512 |
| 4,048,898 A | * | 9/1977 | Salter | 411/44 |
| 4,212,224 A | * | 7/1980 | Bragg et al. | 411/337 |
| 4,230,016 A | * | 10/1980 | Merrell | 411/378 |
| 4,254,542 A | * | 3/1981 | Craig | 29/464 |
| 4,258,464 A | * | 3/1981 | Ullman, Jr. | 29/525.01 |
| 4,386,871 A | * | 6/1983 | Hooker et al. | 403/377 |
| 4,667,628 A | | 5/1987 | Lopez-Crevillen | |
| 4,773,788 A | * | 9/1988 | Ruhl | 403/24 |
| 4,877,364 A | * | 10/1989 | Sorrentino | 411/337 |
| 5,022,679 A | * | 6/1991 | Pazik | 280/833 |
| 5,054,799 A | * | 10/1991 | Fingerle | 280/164.1 |
| 5,215,332 A | * | 6/1993 | De Sloovere | 280/801.1 |
| 5,333,744 A | | 8/1994 | LoCicero et al. | |
| 5,406,894 A | * | 4/1995 | Herrmann et al. | 108/108 |
| 6,109,164 A | * | 8/2000 | Okuhara et al. | 91/376 R |
| 6,238,127 B1 | * | 5/2001 | Jhumra et al. | 403/282 |
| 6,347,678 B1 | | 2/2002 | Osborn et al. | |
| 6,754,992 B1 | * | 6/2004 | Byfield et al. | 52/36.5 |
| 6,931,904 B2 | * | 8/2005 | Jones et al. | 72/355.4 |
| 7,082,664 B2 | * | 8/2006 | Powers et al. | 29/525.02 |
| 7,503,844 B1 | * | 3/2009 | Vidler, Jr. | 454/316 |
| 2005/0095135 A1 | * | 5/2005 | Bucher et al. | 416/210 R |
| 2006/0026808 A1 | * | 2/2006 | Downing et al. | 24/628 |
| 2009/0016807 A1 | * | 1/2009 | Koch | 403/26 |

* cited by examiner

*Primary Examiner*—Daniel P Stodola
*Assistant Examiner*—Joshua T Kennedy
(74) *Attorney, Agent, or Firm*—Jeffrey P. Calfa; Mark C. Bach; Gerald W. Askew (57) ABSTRACT

A mounting system for a component to be mounted to a vehicle frame is provided utilizing keyhole features in the component, and fasteners having sacrificial spacers in the vehicle frame. The sacrificial spacers upon the fasteners prevent them from being pushed into the vehicle frame when the component having keyhole features is placed over them. Once the keyhole features have been placed over the fasteners having sacrificial spacers, the fasteners having sacrificial spacers may be fully tightened, thereby fully contributing to the integrity of the resulting joint.

4 Claims, 9 Drawing Sheets

MOUNTING SYSTEM FOR MODULAR FRAME COMPONENTS

BACKGROUND

Medium and heavy duty vehicles, as well as some light duty pickup trucks and sport utility vehicles, are commonly built using the basic and longstanding design of a vehicle frame supporting a separate body, running gear, and powertrain. Often, during the process of manufacturing the vehicle certain components, such as battery boxes, fuel tank assemblies, fluid reservoirs, and exhaust supports are attached to the vehicle frame subsequent to its assembly. These components may even be added following installation of the running gear and powertrain, such that it is important that the vehicle undergoing construction remain upright. Because of this, and because the components to be attached to the vehicle frame are usually quite heavy, various techniques have been devised to assist in their installation.

Examples of techniques or devises used to temporarily support components to be attached to a vehicle frame during the process of installation include powered lifts or hoists, or fixtures either attached to the vehicle frame or located along the vehicle assembly line. Alternately, smaller brackets, referred to as alignment brackets, are sometimes first attached to the vehicle frame, and followed by attaching the heavier components to the alignment brackets. These alignment brackets may be provided with features that allow the heavier components to remain in place prior to installation and tightening of any fasteners. It is even known to use one or more shoulder bolts in conjunction with keyhole features located in the component to be attached to the vehicle frame, such that the keyhole is placed over the shoulder bolt and the component is left hanging thereupon, until such time as any fasteners may be installed and tightened.

Each of the prior art techniques or devises have one or more drawbacks. Powered lifts or hoists are expensive and add operator time to the cost of manufacturing the vehicle. Fixtures similarly must be designed, built, handled, maintained, removed, and stored, each of which activities add to the cost of the vehicle being manufactured. Alignment brackets add considerably to the cost of manufacturing a vehicle having a vehicle frame, as they add the cost of usually at least two additional pieces, including the associated manufacturing, engineering, and logistics costs. Also, alignment brackets add to stack-up of manufacturing tolerances and increase the number of potentially fallible joints in the assembly.

SUMMARY

It is advantageous in the design and construction of vehicles having vehicle frames to provide a way to temporarily support any heavy components that may need to be installed subsequent to assembly of the vehicle frame. It is further advantageous that any technique or devise that is provided to fulfill this function be inexpensive and easy to install. It has been noted that prior art shoulder bolts and keyhole features have effectively if inefficiently fulfilled this function in such manner. The key drawback to prior art shoulder bolts and keyhole features is the fact that once the remaining conventional fasteners that attach the heavy component to the vehicle frame are tightened, the prior art shoulder bolts and keyhole features contribute nothing to the integrity of the joint. Therefore, once they have done their job at the time of installation, prior art shoulder bolts and keyhole features are entirely redundant and unnecessary.

An ineffective alternative to the shoulder bolt and keyhole is to use a conventional nut and non-shoulder bolt in conjunction with a keyhole feature in the component to be attached to the vehicle frame. The conventional nut and non-shoulder bolt is installed loosely, such that the keyhole feature may be placed over it and then tightened. The reason that this method is ineffective is because when the keyhole feature in the component to be attached to the vehicle frame is moved over the conventional nut and non-shoulder bolt, the nut and bolt tends to catch on the edges of the keyhole feature and slide inwards toward the vehicle frame. Thus, the installation becomes an awkward affair requiring more than one individual to accomplish.

One embodiment of the present invention solves the problems of the prior art by providing a shoulder bolt that works in conjunction with a keyhole in a component to be attached to the vehicle frame, which shoulder bolt will not tend to slide inward toward the vehicle frame when the keyhole feature is placed over it, and which may have a nut fully tightened upon it, thereby becoming a full contributing member to the integrity of the joint. An embodiment of the present invention may be a bolt having a sacrificial spacer, such as shoulder made from an easily compressible, deformable, or extrudable material. The easily compressible, deformable, or extrudable material may be a polymer, rubber, soft plastic, wax, or the like. An alternate embodiment of the present invention may have a sacrificial spacer in the form of shoulder made from a crushable material, such as loosely sintered powder metal or porous ceramic. Yet another embodiment of the present invention may have a separate sacrificial spacer in the form of a sleeve made from an easily compressible, deformable, extrudable, or crushable material, which separate sacrificial sleeve functions in place of a sacrificial shoulder upon the bolt. Another embodiment may have an easily compressible, deformable, extrudable, or crushable sacrificial spacer in the form of a shoulder attached to the nut, such that the bolt extends from within the vehicle frame, and the sacrificial shoulder attached to the nut overlaps a portion of the bolt, thereby functioning in the same manner as an easily compressible, deformable, extrudable, or crushable sacrificial shoulder upon the bolt.

In use, one or more shoulder bolts having a sacrificial spacer in the form of a shoulder made from an easily compressible, deformable, extrudable, or crushable material are installed into one or more holes in the vehicle frame. One or more compatible nuts are threaded onto the one or more sacrificial shoulder bolts sufficiently tightly to hold the sacrificial shoulder bolts in place, yet not tightly enough to compress or crush the easily compressible, deformable, extrudable, or crushable material of which the sacrificial shoulder is made. Keyhole features provided in the component to be attached to the vehicle frame are placed over the head of the sacrificial shoulder bolts, allowing the component to hang from the sacrificial shoulder bolts, while the sacrificial shoulders made from an easily compressible, deformable, extrudable, or crushable material prevent the sacrificial shoulder bolts from catching on the edges of the keyhole features and being pushed back into the holes in the vehicle frame. Any remaining conventional fasteners affixing the component to be attached to the vehicle frame may then be installed and tightened. Finally, the nuts and shoulder bolts having sacrificial shoulders made from easily compressible, deformable, extrudable, or crushable materials are fully tightened. The sacrificial shoulders then either crush or extrude into the slots and clearances of the keyhole feature, allowing the shoulder bolts to become a fully contributing member to the integrity of the joint.

DETAILED DESCRIPTION OF THE INVENTION

Figure 1:
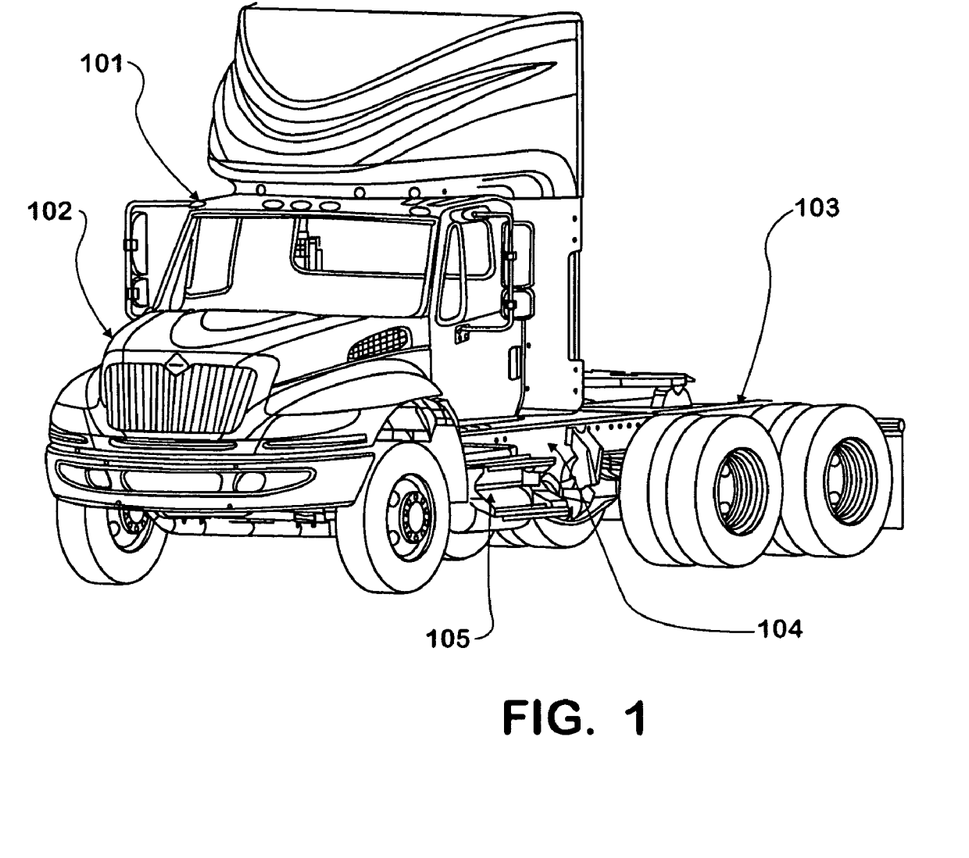
FIG. 1—Vehicle having body, chassis, vehicle frame, and component to be attached to vehicle frame.

FIG. 1 shows a vehicle 101 having a body 102 and a chassis 103. The chassis 103 is comprised of a vehicle frame 104. One or more components 105 are attached to the vehicle frame 104.

Figure 2:
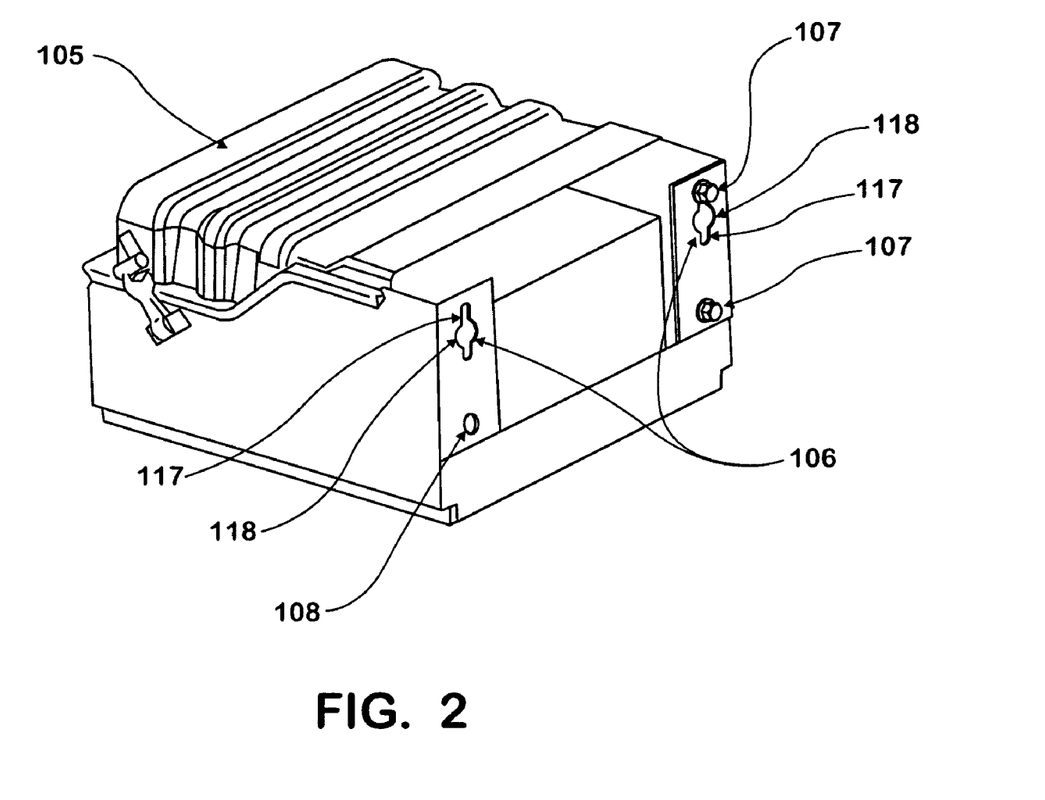
FIG. 2—Component to be attached to vehicle frame.

FIG. 2 shows a component 105 intended to be attached to a vehicle frame 104 (not shown). The component 105 is provided with keyhole features 106 having slots 117 and clearances 118, as well as regular mounting holes 108. For illustrative purposes, conventional fasteners 107 are shown inserted in one of the keyhole features 106 and one of the regular mounting holes 108, although such conventional fasteners 107 would not actually be inserted into the keyhole features 106 or the regular mounting holes 108 prior to installation of the component 105 onto the vehicle frame 104 (not shown).

Figure 3:
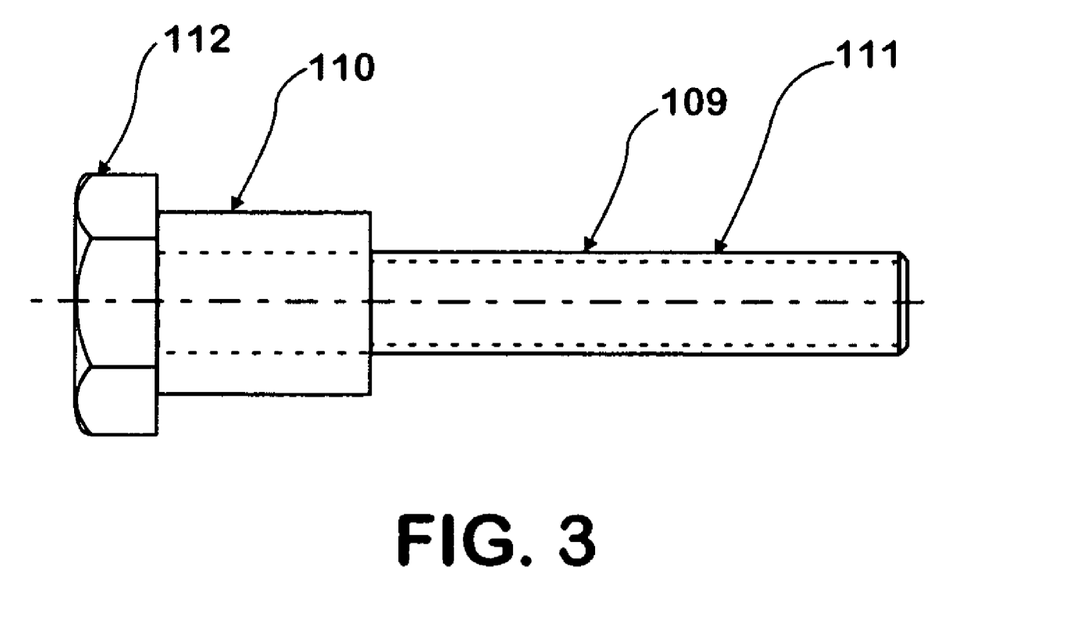
FIG. 3—Bolt with easily compressible, deformable, extrudable, or crushable sacrificial shoulder.

FIG. 3 shows a bolt 109 having an easily compressible, deformable, extrudable, or crushable sacrificial shoulder 110. The easily compressible, deformable, extrudable, or crushable sacrificial shoulder 110 is located between the threaded portion of the body 111 and the head of the bolt 112, and is of greater diameter than the nominal diameter of the threaded portion of the body 111 and of lesser diameter than the nominal diameter of the head of the bolt 112. The easily compressible, deformable, extrudable, or crushable sacrificial shoulder 110 may be made from polymer, rubber, soft plastic, wax, loosely sintered powder metal, or porous ceramic material, or any like material which qualifies as easily compressible, deformable, extrudable, or crushable. The easily compressible, deformable, extrudable, or crushable sacrificial shoulder 110 may be bonded to, overmolded upon, or mechanically attached to the bolt 109.

Figure 4:
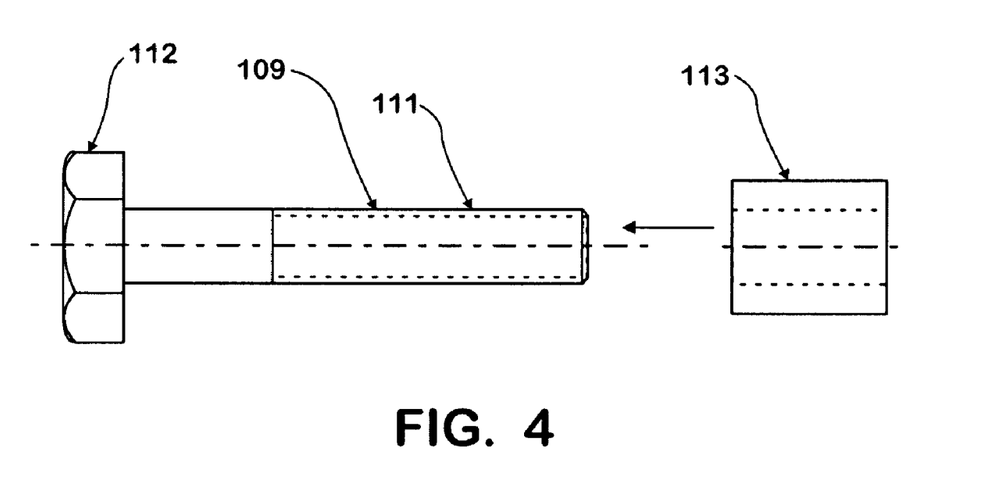
FIG. 4—Bolt and easily compressible, deformable, extrudable, or crushable sacrificial sleeve.

FIG. 4 shows a bolt 109 and an easily compressible, deformable, extrudable, or crushable sacrificial sleeve 113. In use, the easily compressible, deformable, extrudable, or crushable sacrificial sleeve 113 is inserted over the bolt 109 so that it performs the same function as the easily compressible, deformable, extrudable, or crushable sacrificial shoulder 110 on the bolt 109 shown in FIG. 3. The easily compressible, deformable, extrudable, or crushable sacrificial sleeve 113 shown in FIG. 4 is again of greater diameter than the nominal diameter of the threaded portion of the body 111 and of lesser diameter than the nominal diameter of the head of the bolt 112, and is again made from polymer, rubber, soft plastic, wax, loosely sintered powder metal, or porous ceramic material, or any like material which qualifies as easily compressible, deformable, extrudable, or crushable.

Figure 5:
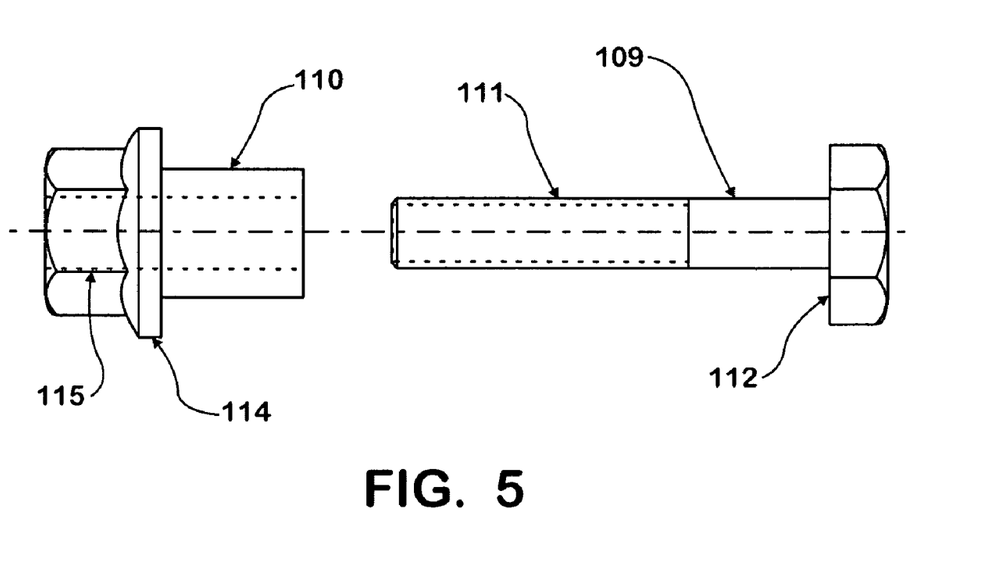
FIG. 5—Bolt and nut having easily compressible, deformable, extrudable, or crushable sacrificial shoulder.

FIG. 5 shows a bolt 109 and a nut 114 having an easily compressible, deformable, extrudable, or crushable sacrificial shoulder 110. The bolt 109 is a conventional bolt having a threaded portion 111 and a head 112. The easily compressible, deformable, extrudable, or crushable sacrificial shoulder 110 is attached to the nut 114, and aligned axially with the threaded bore 115 of the nut 114. The easily compressible, deformable, extrudable, or crushable sacrificial shoulder 110 is of greater diameter than the nominal diameter of the threaded portion of the body 111 of the bolt 109 and of lesser diameter than the nominal diameter of the nut 114, and is again made from polymer, rubber, soft plastic, wax, loosely sintered powder metal, or porous ceramic material, or any like material which qualifies as easily compressible, deformable, extrudable, or crushable. The easily compressible, deformable, extrudable, or crushable sacrificial shoulder 110 may be bonded to, overmolded upon, or mechanically attached to the nut 114.

Figure 6:
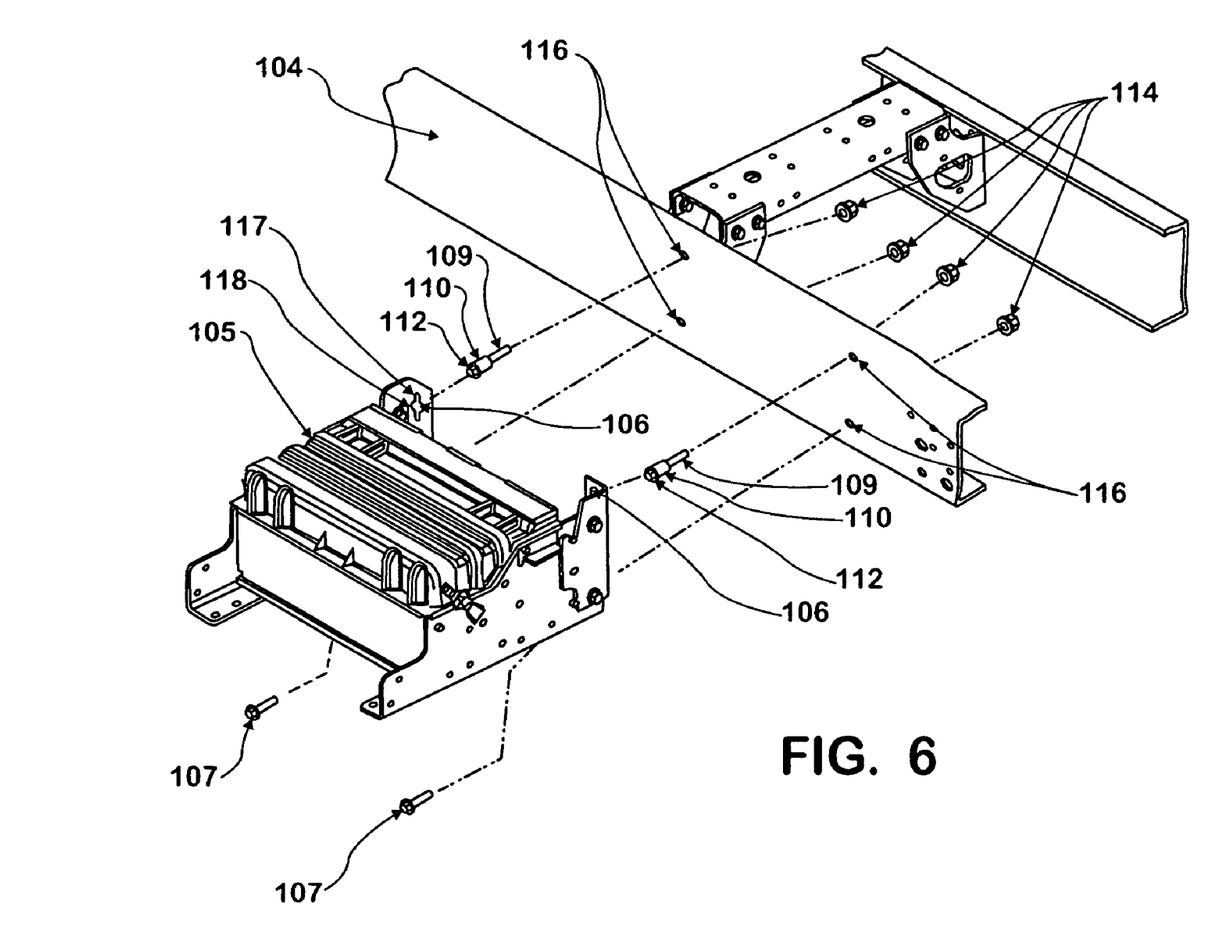
FIG. 6—Exploded view of component to be mounted to frame using keyhole feature and shoulder bolt having easily compressible, deformable, extrudable, or crushable sacrificial shoulder.

FIG. 6 shows a vehicle frame 104 and a component 105 to be mounted to the vehicle frame 104 in an exploded view. Bolts 109 having easily compressible, deformable, extrudable, or crushable sacrificial shoulders 110 are inserted into frame mounting holes 116. Nuts 114 are threaded onto the bolts 109 having easily compressible, deformable, extrudable, or crushable sacrificial shoulders 110, and are tightened sufficiently to retain the bolts 109, but not tightly enough to compress or crush the easily compressible, deformable, extrudable, or crushable sacrificial shoulders 110. The component 105 to be mounted to the vehicle frame 104 is placed such that the keyhole features 106 having slots 117 and clearances 118 pass over the heads 112 of the bolts 109, and rest upon the easily compressible, deformable, extrudable, or crushable sacrificial shoulders 110, thereby temporarily supporting the component 105. Conventional fasteners 107 are then installed through regular mounting holes 108 (not visible in view) and through frame mounting holes 116 and are fully tightened. The nuts 114 upon the bolts 109 having easily compressible, deformable, extrudable, or crushable sacrificial shoulders 110 are then fully tightened, such that the easily compressible, deformable, extrudable, or crushable sacrificial shoulders 110 either crush or extrude into the unoccupied slots 117 and clearances 118 of the keyhole features 106, allowing the bolts 109 to become a fully contributing member to the integrity of the mounting of the component 105 to the vehicle frame 104.

Figure 7:
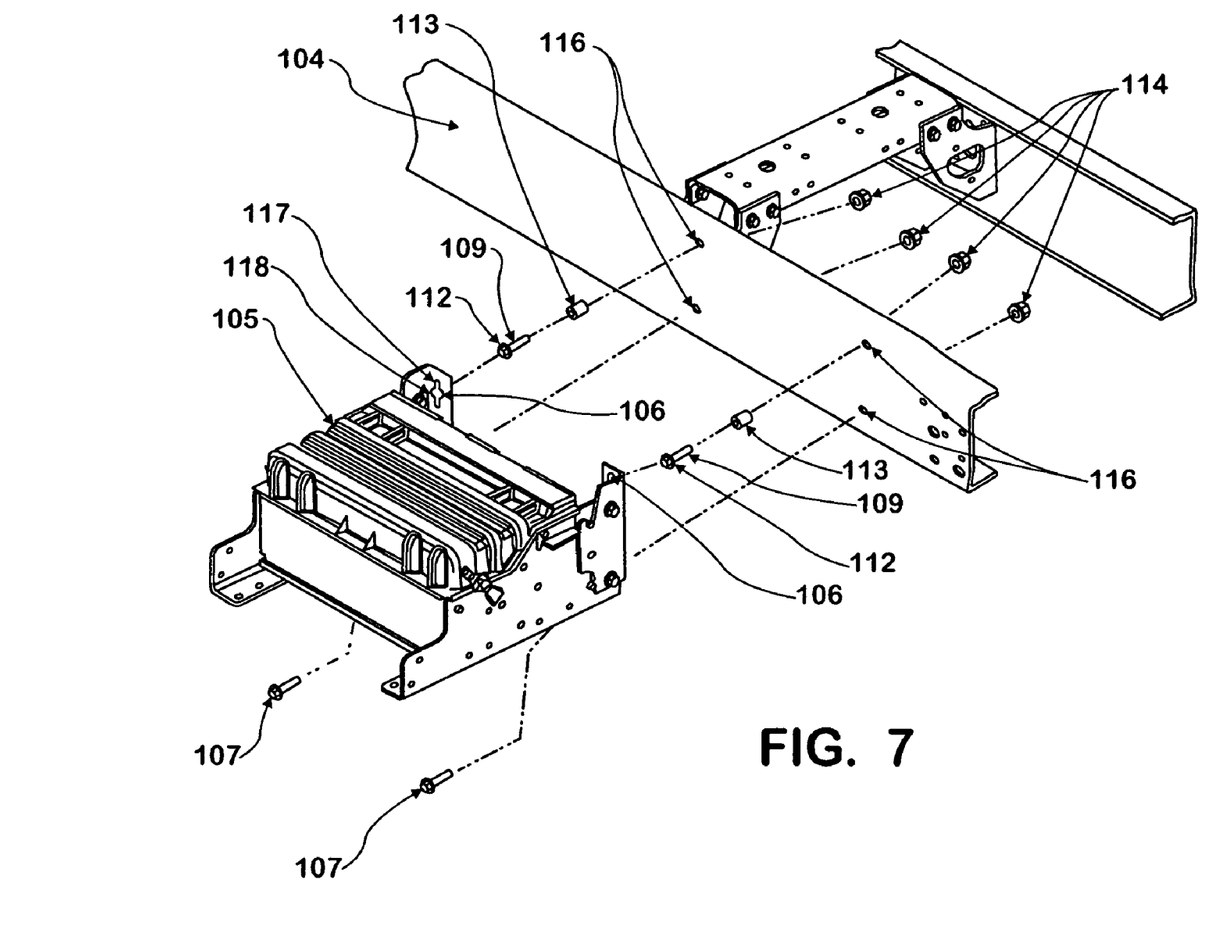
FIG. 7—Exploded view of component to be mounted to frame using keyhole feature and bolt with easily compressible, deformable, extrudable, or crushable sacrificial sleeve.

FIG. 7 shows a vehicle frame 104 and a component 105 to be mounted to the vehicle frame 104 in an exploded view, similar to the vehicle frame 104 and component 105 shown in FIG. 6. Easily compressible, deformable, extrudable, or crushable sacrificial sleeves 113 are placed over bolts 109, which bolts 109 are inserted into frame mounting holes 116. Nuts 114 are threaded onto the bolts 109, and are tightened sufficiently to retain the bolts 109, but not tightly enough to compress or crush the easily compressible, deformable, extrudable, or crushable sacrificial sleeves 113. The component 105 to be mounted to the vehicle frame 104 is placed such that the keyhole features 106 having slots 117 and clearances 118 pass over the heads 112 of the bolts 109, and rest upon the easily compressible, deformable, extrudable, or crushable sacrificial sleeves 113, thereby temporarily supporting the component 105. Conventional fasteners 107 are then installed through regular mounting holes 108 (not visible in view) and through frame mounting holes 116 and are fully tightened. The nuts 114 upon the bolts 109 are then fully tightened, such that the easily compressible, deformable, extrudable, or crushable sacrificial sleeves 113 either crush or extrude into the unoccupied slots 117 and clearances 118 of the keyhole features 106, allowing the bolts 109 to become a fully contributing member to the integrity of the mounting of the component 105 to the vehicle frame 104.

Figure 8:
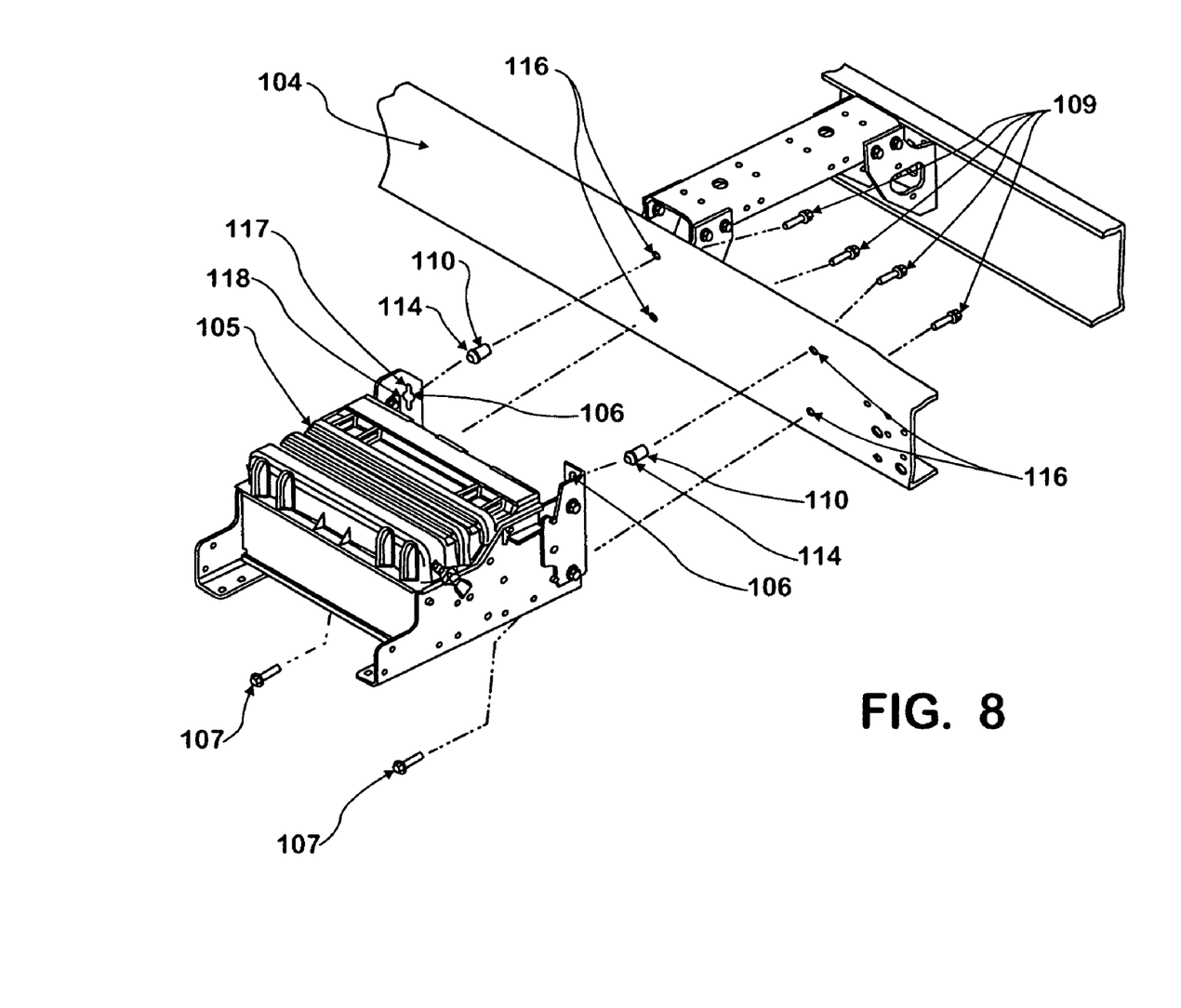
FIG. 8—Exploded view of component to be mounted to frame using keyhole feature and nut with easily compressible, deformable, extrudable, or crushable sacrificial shoulder.

FIG. 8 shows a vehicle frame 104 and a component 105 to be mounted to the vehicle frame 104 in an exploded view, similar to the vehicle frames 104 and components 105 shown in FIG. 6 and FIG. 7. Bolts 109 are inserted into frame mounting holes 116 from within the vehicle frame 104. Nuts 114 having easily compressible, deformable, extrudable, or crushable sacrificial shoulders 110 are threaded onto the bolts 109, and are tightened sufficiently to retain the bolts 109, but not tightly enough to compress or crush the easily compressible, deformable, extrudable, or crushable sacrificial shoulders 110 of the nuts 114. The component 105 to be mounted to the vehicle frame 104 is placed such that the keyhole features 106 having slots 117 and clearances 118 pass over the nuts 114, and rest upon the easily compressible, deformable, extrudable, or crushable sacrificial shoulders 110, thereby temporarily supporting the component 105. Conventional fasteners 107 are then installed through regular mounting holes 108 (not visible in view) and through frame mounting holes 116 and are fully tightened. The nuts 114 having easily compressible, deformable, extrudable, or crushable sacrificial shoulders 110 upon the bolts 109 are then fully tightened, such that the easily compressible, deformable, extrudable, or crushable sacrificial shoulders 110 either crush or extrude into the unoccupied slots 117 and clearances 118 of the keyhole features 106, allowing the bolts 109 to become a fully contributing member to the integrity of the mounting of the component 105 to the vehicle frame 104.

Figure 9:
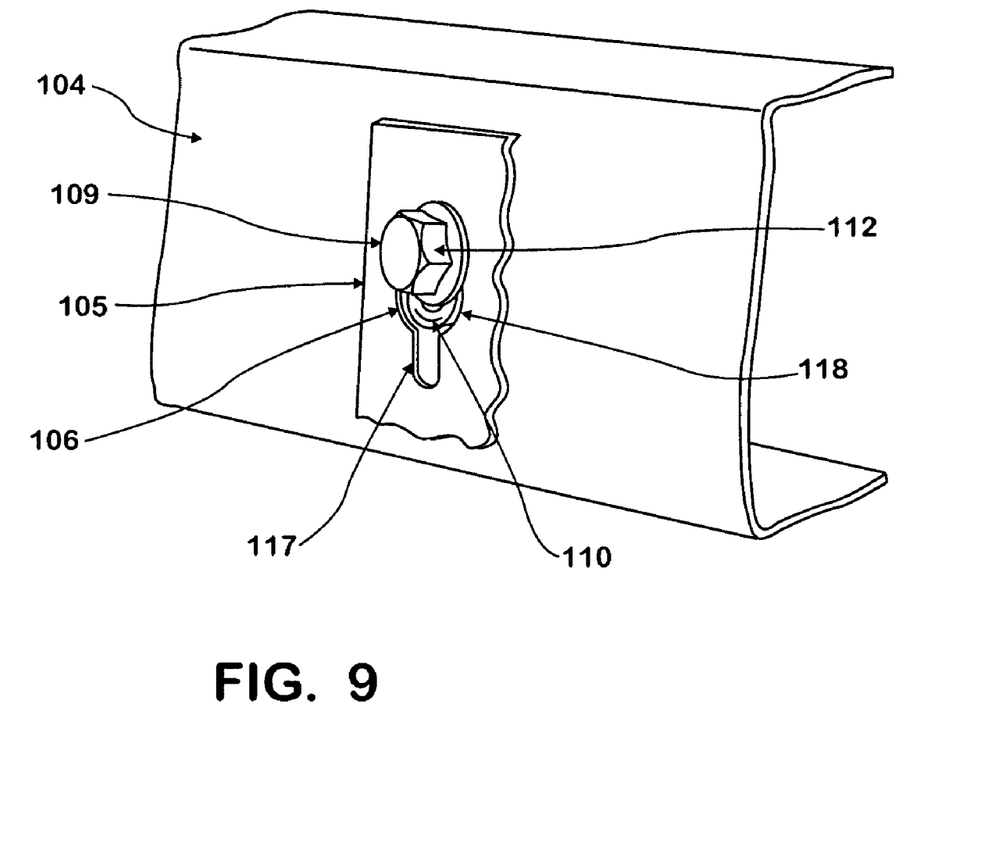
FIG. 9—Bolt with easily compressible, deformable, extrudable, or crushable sacrificial shoulder, installed.

FIG. 9 shows a section of a vehicle frame 104 and a portion of the component 105 to be mounted to the vehicle frame 104. The keyhole feature 106 having slots 117 and a clearance 118 has been placed over the head 112 of the bolt 109, and the nut 114 (not visible) has been fully tightened. The easily compressible, deformable, extrudable, or crushable sacrificial shoulder 110 is shown extruded from beneath the head 112 of the bolt 109 and at least partially into the slot 117 or clearance 118. Alternately, if the easily compressible, deformable, extrudable, or crushable sacrificial shoulder 110 is instead crushed, the crushed remnants of the easily compressible, deformable, extrudable, or crushable sacrificial shoulder 110 may flow into the slot 117 or clearance 118 of the keyhole feature 106.

While specific embodiments have been described in detail in the foregoing detailed description and illustrated in the accompanying drawings, those with ordinary skill in the art will appreciate that various permutations of the invention are possible without departing from the teachings disclosed herein. Accordingly, the particular arrangements disclosed are meant to be illustrative only and not limiting as to the scope of the invention, which is to be given the full breadth of the appended claims and any and all equivalents thereof. Other advantages to a vehicle equipped with a component mounting system utilizing keyhole features and easily compressible, deformable, extrudable, or crushable sacrificial spacers in the form of shoulder bolts, sleeves, or shoulder nuts may also be inherent in the invention, without having been described above.

We claim:

1. A mobile vehicle for operation on the ground, comprising:
    a vehicle frame, the vehicle frame having an outer surface;
    at least one component to be mounted to the vehicle frame, the at least one component to be mounted to the vehicle frame having an outer surface and an inner surface;
    at least one keyhole feature in the at least one component to be mounted to the vehicle frame, the at least one keyhole feature including at least one slot and a clearance;
    at least one fastening device compatible with the at least one keyhole feature in said the at least one component to be mounted to the vehicle frame, the at least one fastening device comprising a bolt having a flanged head, a nut and a sacrificial spacer;
    the at least one fastening device being installed on the vehicle frame prior to installation of the at least one component such that the sacrificial spacer holds the at least one fastening device in position on the vehicle frame prior to tightening to receive the keyhole feature of the at least one component;
    the keyhole feature clearance of the at least one component being placed over the flanged head of the at least one fastening device and the at least one component being lowered such that the at least one slot engages the at least one fastening device and the at least one component hangs upon the at least one fastening device prior to tightening the at least one fastening device;
    wherein tightening of the nut against the vehicle frame causes the at least one fastening device to compress and deform said sacrificial spacer such that the sacrificial spacer flows into at least the slot and brings the flanged head of the at least one fastening device into direct contact with the inner surface of the at least one component to be mounted to the vehicle frame, and brings the outer surface of the at least one component into direct contact with the outer surface of the vehicle frame.

2. The mobile vehicle for operation on the ground of claim 1, wherein:
    the sacrificial spacer further comprises a sacrificial shoulder upon the bolt.

3. The mobile vehicle for operation on the ground of claim 2, wherein:
    the sacrificial spacer further comprises a compressible, deformable, extrudable sacrificial spacer.

4. The mobile vehicle for operation on the ground of claim 2, wherein:
    the sacrificial spacer further comprises a brittle crushable sacrificial spacer.

* * * * *